Reissued July 15, 1930 Re. 17,737

UNITED STATES PATENT OFFICE

ROBERT B. GAGE, OF TRENTON, NEW JERSEY

METHOD OF CURING CONCRETE

No Drawing. Original No. 1,672,380, dated June 5, 1928, Serial No. 50,483, filed August 15, 1925. Application for reissue filed May 20, 1930. Serial No. 454,175.

The strength of a mass of concrete is dependent upon the even drying, setting and aging of the mass. This is difficult to rightly accomplish in the manufacture of concrete roads and pavements because of the relatively large surface exposed to the drying action of the air and sun which tends to dry the surface before the even hydration of the cement has occurred.

To overcome this the surface of a concrete road after it has been placed is sometimes covered with water by building an earth dam on each side of the concrete and across it at intervals. This is quite costly, and not very practical when the pavement is constructed on a grade. Other methods of curing concrete are to cover the surface with straw or burlap, and to keep these materials wetted by sprinkling until the curing of the concrete has been accomplished, but this is troublesome not only because of the necessity of frequent sprinkling, but also because it is necessary to prevent the covering from being disturbed by the wind. Burlap or canvas have also been suspended on frames a short distance above the pavement, but this is a costly method and the frames are difficult to keep in place in windy weather.

I have discovered that a more efficient and more economical method of accomplishing the even drying and setting of concrete is to cover the surface of the concrete after it has been placed, with a layer of bituminous felt or other heavy paper saturated or coated with a waterproofed bituminous layer. Ordinary roofing felt answers the purpose well.

This material, differing from those previously used for the purpose, is waterproof, so that the sun and air acting upon the upper surface of the covering do not draw up and evaporate the moisture of the upper surface of the concrete; but, on the contrary, the moisture is retained beneath the bituminous felt so that the upper surface of the concrete is kept moist and consequently cured at a rate more nearly corresponding to that of the lower part of the concrete which is in contact with the damp ground.

Furthermore bituminous felt is highly absorbent of heat and the warmth of the subjacent concrete thus created helps the even hardening of the concrete, and also prevents freezing on frosty nights. At the end of a few days the curing is accomplished and the covering is removed.

I am aware that various absorbent coverings have been employed to protect the surface of freshly laid concrete from the cold and to prevent it from freezing. I am also aware of the use of various dampened surfaces as I have above described to prevent the too rapid drying of the upper surface of the concrete by the atmosphere and the sun.

My invention differs from these in that I employ as a temporary covering a felt paper which has been rendered waterproof or non-absorbent of water, by the application of a bituminous saturation or coating. I believe this to be novel, and I have found that it is highly efficient for the reasons which I have previously explained.

Having thus described my invention, I claim:

1. The method of curing concrete which consists in placing the concrete and then temporarily covering the surface thereof which is exposed to the atmosphere with a non-absorbent bituminous felt, until the even curing of the concrete is accomplished.

2. The method of making a concrete pavement which consists in placing a layer of concrete upon a suitable foundation; and temporarily covering the upper surface thereof with a layer of bituminous felt, and maintaining such covering until the concrete surface is completely and evenly set.

3. The method of curing cement concrete which comprises placing the concrete and then retarding the evaporation of original moisture from the surface exposed to the atmosphere by laying directly on said exposed surface a covering of sheet material carrying bitumen whereby the moisture will be retained in the said covered concrete and leaving said material on the concrete a sufficient length of time to prevent the drying of said surface before hydration of the cement has occurred, whereby the even curing of the concrete is accomplished.

4. The method of curing cement concrete which comprises placing the concrete and then retarding the evaporation of original moisture from the surface exposed to the atmosphere by laying directly on said exposed surface a bituminated covering comprising bituminated felted fibrous sheet material, whereby the moisture will be retained in the said covered concrete and leaving said material on the concrete a sufficient length of time to prevent the drying of said surface before hydration of the cement has occurred, whereby the even curing of the concrete is accomplished.

In testimony of which invention I have hereunto set my hand, at Philadelphia, Pennsylvania, on this 2nd day of April, 1930.

ROBERT B. GAGE.